May 2, 1967  B. S. SAIN  3,316,777
BRAKE PEDAL DEPRESSING AND HOLDING DEVICE
Filed March 8, 1965
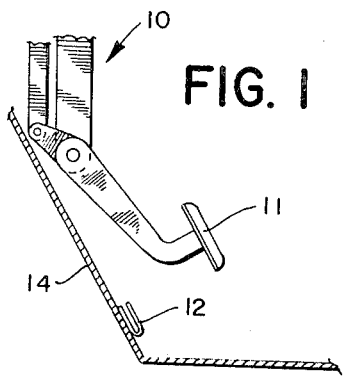
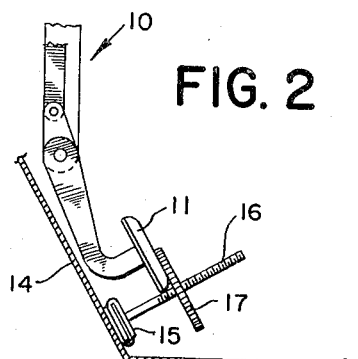
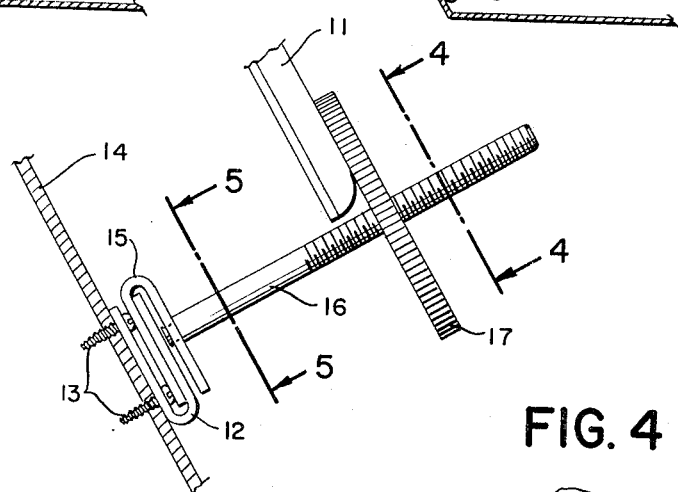
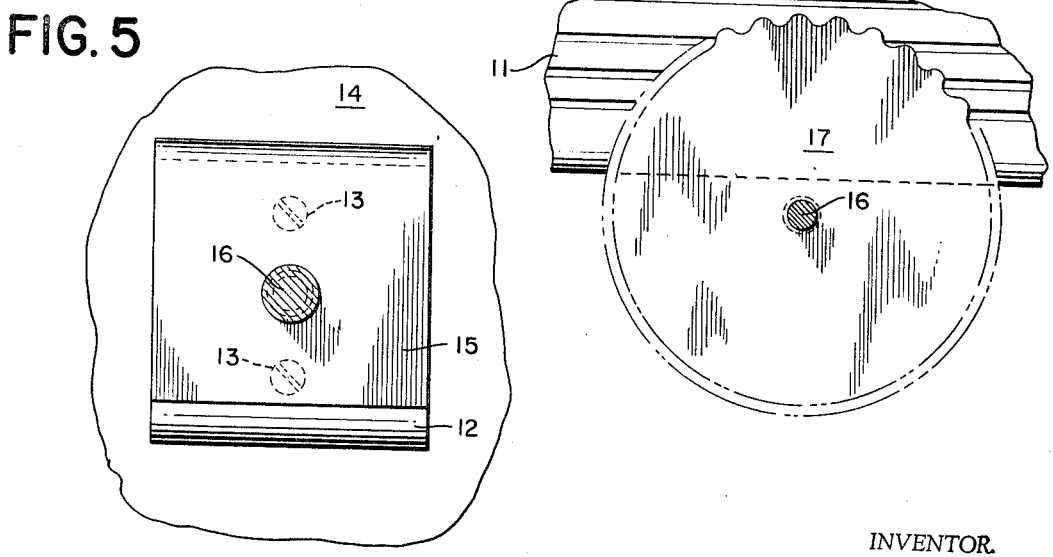
INVENTOR.
BERNARD S. SAIN
BY
ATTORNEY

United States Patent Office 3,316,777
Patented May 2, 1967

3,316,777
BRAKE PEDAL DEPRESSING AND HOLDING
DEVICE
Bernard S. Sain, 75 Forest Hill Road,
West Orange, N.J. 07052
Filed Mar. 8, 1965, Ser. No. 437,922
2 Claims. (Cl. 74—532)

ABSTRACT OF THE DISCLOSURE

A slotted flattened base member secured to the floor of an automobile adjacent the brake pedal, and a threaded shaft having a lower enlargement which removably slides into the slotted base member. A knurled hand operated wheel is threaded on the shaft and, by screwing it down, the wheel may apply constant pressure to the brake pedal for locking the automobile against accidental movement.

This invention relates to automobile brake pedal depressing and holding means so that a brake pedal may be held depressed and the brakes engaged without requiring the car to be occupied. One example of the usefulness of such a device is when a tire is to be changed, requiring the car to be jacked up. It is advisable to lock the brakes at such a time.

The desirability of a device as above described is well recognized and considerable attempts have been made to solve the problem satisfactorily. To my knowledge none has solved the problems of providing a simple and effective device which can be removed or installed with ease.

With the above in mind, I have devised a brake depressing device which is quickly and easily installed and which can serve practically any kind of car having a depressible brake pedal. My device is extremely easy to operate since it provides a sturdy wheel or disk which is directly grasped and screwed down to apply pressure against the brake pedal.

The problem will be further understood from the following description and drawings wherein:

FIGURE 1 is a fragmentary, elevational view illustrating the disposition of an adaptor which permits my device to be quickly disposed in operating position;

FIGURE 2 is a view similar to FIGURE 1, but illustrating my device in operation;

FIGURE 3 is an enlarged fragmentary view similar to FIGURE 2;

FIGURE 4 is a top view of the operating wheel as taken along the line 4—4 of FIGURE 3; and FIGURE 5 is a top view of the adaptor as taken along the line 5—5 of FIGURE 3.

My device is illustrated as applied to a modern automobile having a brake linkage 10 terminating at its free end in a brake pedal 11 which applies brakes to all four wheels. Such linkage may take various forms as is well known. My device includes an adaptor unit comprising a C-shaped floor bracket 12 which is permanently fastened as by bolts 13 to the foot board or fire wall 14 of the vehicle immediately below the brake pedal. As noted in FIGURE 1, the mouth of bracket 12 is upwardly directed.

Adapted to mate with floor bracket 12 is its complementary C-shaped shaft bracket 15 which has its top wall riveted or the like to screw threaded shaft 16. Threaded on shaft 16 is the sturdy, knurled edge wheel 17 having a threaded bore, the wheel of course traveling up and down the shaft 16 as the wheel is rotated. The C-shaped brackets are of flattened form and they interengage by interleaving their mouths.

Normally, only the floor bracket 12 is visible and it forms no obstruction to normal operation of the vehicle. When, however, the brakes are to be applied as above described, the shaft unit is removed from the trunk or glove compartment of the car and shaft bracket 15 is simply slipped onto engagement with floor bracket 12. This will hold the shaft 16 in proper position where it extends from and is oriented substantially perpendicularly from foot board 14. It may sometimes be necessary to pedally depress brake pedal 11 to facilitate the desired engagement.

At the time the wheel 17 is grasped and rotated so that it bears firmly against the brake pedal 11 and holds it down with considerable pressure.

While the dimensions of my device may be widely varied, I have found, for example, that a wheel 17 of a diameter of 4 inches or so and a ½ inch thickness is effective because it is easily grasped and operated and applies pressure over a wide area. With such a wheel, I employed a shaft 16 of about ⅜ inch diameter and five inch length, while the brackets 12 and 15 were about four inches long to provide a firm engagement.

It will be recognized from the above that my device is most easily installed, applied, and removed, and may be used in any type of automobile. Knurled edge wheel 17 is easily grasped and can be caused to apply great pressure without danger of slipping, a factor which is of great importance.

I have shown a preferred embodiment of my invention, but it is obvious that numerous changes and omissions may be made without departing from its spirit.

What is claimed is:

1. In an automobile having a brake pedal and a floor board below, a brake pedal depressing and holding device comprising a slotted, flattened bracket permanently connected to said floor board and having at least one open side, a screw threaded shaft, a flattened enlargement fixedly disposed on the lower end of said shaft and removably engaging said flattened bracket by being inserted through said open side and interleaved thereby with said bracket, said shaft thereby extending outwardly and upwardly of said floor board, and a wheel having a threaded bore rotatably mounted on said shaft so as to travel up or down as the wheel is rotated whereby pressure may be applied thereby to said brake pedal, said wheel being in the form of a flat disk and being manually rotatable relative to said shaft.

2. A device according to claim 1 and wherein said slotted flattened bracket is C-shaped, and said flattened enlargement also being C-shaped, the mouth of said C-shaped flattened bracket being disposed upward so that said flattened enlargement engages said flattened bracket by sliding into said mouth.

References Cited by the Examiner

UNITED STATES PATENTS

| 2,109,942 | 3/1938 | Dee | 52—509 |
| 2,553,448 | 5/1951 | Frauen | 74—532 |
| 2,730,209 | 1/1956 | Larsen | 52—242 |
| 2,766,960 | 10/1956 | Weber | 74—532 |
| 2,838,064 | 6/1958 | Schieberl | 74—566 |

FRED C. MATTERN, Jr., *Primary Examiner.*

W. S. RATLIFF, *Assistant Examiner.*